(12) United States Patent
Davari (10) Patent No.: US 8,982,726 B2
(45) Date of Patent: Mar. 17, 2015

(54) NETWORK DEVICE

(76) Inventor: Shahram Davari, Los Altos, CA (US)

(*) Notice: Subject to any disclaimer, the term of this patent is extended or adjusted under 35 U.S.C. 154(b) by 412 days.

(21) Appl. No.: 13/007,816

(22) Filed: Jan. 17, 2011

(65) Prior Publication Data

US 2012/0182900 A1 Jul. 19, 2012

(51) Int. Cl.
*H04L 12/10* (2006.01)
*H04L 12/40* (2006.01)
*H04L 12/24* (2006.01)
*H04L 12/26* (2006.01)

(52) U.S. Cl.
CPC .......... *H04L 12/10* (2013.01); *H04L 12/40032* (2013.01); *H04L 41/24* (2013.01); *H04L 43/062* (2013.01); *H04L 43/0817* (2013.01); *H04L 43/0835* (2013.01); *H04L 43/0841* (2013.01); *H04L 43/0858* (2013.01); *H04L 43/0864* (2013.01)
USPC ....................................................... 370/254

(58) Field of Classification Search
None
See application file for complete search history.

(56) References Cited

U.S. PATENT DOCUMENTS

| | | | | |
|---|---|---|---|---|
| 2005/0254431 A1* | 11/2005 | Sills | ............................. | 370/241 |
| 2008/0069004 A1* | 3/2008 | Huff | ............................. | 370/248 |
| 2009/0060531 A1* | 3/2009 | Biegert et al. | ................. | 398/214 |
| 2009/0097855 A1* | 4/2009 | Thelen et al. | ................. | 398/115 |
| 2009/0164625 A1* | 6/2009 | Roll et al. | ..................... | 709/224 |
| 2009/0317073 A1* | 12/2009 | Hotchkiss et al. | ................. | 398/1 |
| 2010/0150556 A1* | 6/2010 | Soto et al. | ......................... | 398/66 |
| 2010/0178054 A1* | 7/2010 | Cain | ................................ | 398/58 |
| 2010/0280858 A1* | 11/2010 | Bugenhagen | ...................... | 705/7 |
| 2010/0303465 A1* | 12/2010 | Dahlfort | ......................... | 398/115 |
| 2011/0069967 A1* | 3/2011 | Culpepper | ..................... | 398/139 |
| 2011/0243568 A1* | 10/2011 | Lai | ................................ | 398/138 |
| 2012/0093508 A1* | 4/2012 | Baykal et al. | .................... | 398/58 |
| 2013/0077499 A1* | 3/2013 | Schmitz et al. | ............... | 370/249 |

* cited by examiner

*Primary Examiner* — Alpus H Hsu
*Assistant Examiner* — Hooman Houshmand
(74) *Attorney, Agent, or Firm* — Bijan Tadayon; Saied Tadayon (57) ABSTRACT

In this disclosure, we have the following examples and teachings: (1) Integrating the NID functionality in to the small foot-print of an SFP Module, with one or more of the features below: a) Mounting a NID SoC IC to an existing SFP Printed Circuit Board (PCB); b) Using the power from the SFP module, without requiring separate external power; c) NID SoC having only 2 ports, each with its own MAC and possibly PHY layer; d) NID SoC having an embedded microprocessor, RAM and ROM; e) Running a Web portal or other remote login and management software on the NID SoC; f) Miniaturizing the NID to make it cheaper, with reduced cost of inventory, shipment, and installation; and/or g) Supporting one or more (multiple) of the following functions in NID SoC: OAM, Media conversion, Rate adaptation, Policing & marking, Shaping, SLA performance monitoring, Statistics collection, Header manipulation, Security, and/or In-band management. (2) Building the NID functionality in a Dongle that hangs off an Electrical Ethernet port that supports POE (Power over Ethernet), with one or more of the features below: a) Similar to SFP-NID, but hanging off an Electrical Ethernet port; and/or b) Using the power from the Ethernet port POE, without requiring separate external power.

18 Claims, 6 Drawing Sheets

NETWORK DEVICE

BACKGROUND OF THE INVENTION

This invention relates to network connectivity, devices, system, and management. Here are the rough definitions/terminology for acronyms that we are using in this disclosure. The definitions are given solely for the purpose of illustrations and examples, for a better clarification for the reader. Therefore, the definitions are not meant to limit the scope of the invention by any means. In addition, the definitions are not meant to limit or change the actual scope/meaning of the acronyms by any means.

Rough Definitions/Terminology:

NID: Network Identification Device, or sometimes called Network Demarcation Device (NDD). NID is installed at customer premise so that a communication service provider can diagnose and ensure service delivery up to the NID.

SFP: Short Form factor Pluggable optical module. SFP is plugged into communication requirements, such as switch and routers, to provide a media conversion, such as converting electrical signals to optical for transport over fiber optics. SFP is mainly used for data rates of 1 Gbit/s to 5 Gbit/s.

XFP: is the same as SFP, but for higher data rates, such as 10 Gbit/s.

OAM: Operation, Administration and Management. OAM is a powerful tool used by communication service providers to manage and diagnose communication problems.

SP: Service Provider is a company that provides data, voice (and possibly video communication), and connectivity for the customers. Example of SP is AT&T and Verizon.

MEF: Metro Ethernet Forum: is an industry forum that is chartered to define Ethernet services and interoperable capabilities.

MAC: Media Access Control: is a Data link layer protocol used by Ethernet.

SNMP: Simple Network Management Protocol is a standard protocol that manages the equipment in a data communication network.

NMS: Network Management System is the software that controls the complete network of a service provider.

802.1 and 802.3: are IEEE (Institute of Electrical and Electronics Engineers) standard groups that standardize the Ethernet.

MPLS: Multi-Protocol Label Switching is a standard protocol that is used in routed networks.

SLA: Service Level Agreement is a set of parameters that are agreed between a service provider and customer, and must be guaranteed by service provider, and monitored for compliance.

WAN: Wide Area Network refers to the network that covers a large geographical area.

NE: Network Element is any router or switch that forwards and processes the messages.

CPE: Customer Premise Equipment is an electronics equipment that is placed at the customer site, but belongs to the service provider.

MEP and MIP: Maintenance End Point and Maintenance Intermediate Point are reference points that can initiate or process the OAM messages.

CIR: Committed Information Rate is the data rate that is guaranteed by the service provider to be delivered to the customer.

EIR: Excess Information Rate is the data rate that is NOT guaranteed by the service provider to be delivered to the customer, but the service provider does its best effort to deliver them.

CBS: Committed Burst Size: The Max amount of short term traffic associated with CIR that the service provider guaranteed to support.

EBS: Excess Burst Size: The Max amount of short term traffic associated with EIR that the service provider does its best to support.

OPEX: Operational Expenditure.

CAPEX: Capital Expenditure.

ITU-T: International Telecommunication Union: is a body of the United Nations that regulates telecommunication worldwide.

IETF: Internet Engineering Task Force: is a standard organization that standardizes the Internet technology.

MIBs: Management Information Base: defines series of parameters and variables that are needed to control any communication protocol or technology.

BW: Bandwidth: refers to the Max data-rate supported.

C-VLAN: Customer Virtual Local Area Network: is a virtual network identified by a Tag in the Ethernet frame/message.

P-Bits: Priority bits: are 3 bits of information encoded in a VLAN tag that identify the priority of an Ethernet frame.

XAUI: Extended Attachment Unit Interface: is a 10 Gbit/s serial link standard used in an Ethernet equipment.

XENPACK: is an optical module that does the same function as that of an XFP, but is larger in size.

ACL: Access Control List: is basically filtering frames, to prevent unauthorized access to the network by a customer.

POE: Power over Ethernet is a technology that can deliver Electrical power using the Ethernet wiring.

CAT5: is a type of wiring used for connecting various Ethernet pieces of equipment to each other.

EMS-NMS: Element Management System—Network Management System.

SoC: System on a chip: is a semiconductor chip with Input/Output and a microcontroller.

PCB: Printed Circuit Board.

CRC: Cyclic Redundancy Check is a error detection code used in data frames to detect bit errors.

ICV: Integrity Check Value is a error detecting code, such as CRC, that ensures packet is not modified.

PHY: A semiconductor device that terminates and processes the Physical Layer signals.

Serdes: Serializer/Deserializer: is an electronic function that converts parallel signals to serial and vice versa.

PE: Provide Edge device: is a switch/router that is located at the edge of a SP network and connects (directly or indirectly) to customer equipment (CE).

CE: Customer Equipment is a switch/router that is located at the customer premise and connects (directly or indirectly) to Provide Edge device, PE.

CLE/NTE: Customer Located Equipment/Network Termination Equipment.

SFI: Serdes Framer Interface is an scalable interface, defined between PHY and Framer chips.

Introduction:

A NID is generally used as a Demarcation Device to mark the hand-off point between a service provider (SP) and a customer, or between two service providers. The main function of a NID is to permit the SP to monitor the health of the connection and the service up to the NID (hand-off point), therefore, eliminating finger-pointing. A NID could also perform more advanced functions, such as rate adaptation, media conversion, policing, shaping, security, performance monitoring, statistics collection and even packet header manipulation. A NID generally could have 2 or more physical ports.

MEF is working on the definition of NIDs. IEEE 802.1aj is also the specification of Two Port MAC relay, which is mainly used in NIDs.

An SFP-NID is a NID that has only 2 physical ports and fits inside an SFP, XFP, or Xenpack module. It can also fit inside a dingle that could attach to Ethernet ports that support PoE (Power-over-Ethernet). An SFP-NID is powered by the host equipment that it attaches to, and does not require separate power supply. The differentiating factors of SFP-NID, compared to NIDs in the market, are that it is much smaller and does not require external power. Therefore, it is cheaper and easier to store and does not require extra space for installation. It could also be easily and cheaply mailed to customers for self-installation.

SUMMARY OF THE INVENTION

The main function of SFP-NID is to provide OAM capability for SPs, to check the status and health of the connections and services up to the SFP-NID. Other functions are rate adaptation, media conversion, and in-band management and configuration via SNMP modules and NMS interface. A more advanced SFP-NID could also provide added functions, such as security, policing, shaping, performance monitoring, statistics collection and header manipulation (such as MPLS, 802.1ad, and 802.1ah encapsulation).

In this invention, we have the following embodiments:

1. Integrating the NID functionality in to the small footprint of an SFP Module, with one or more of the features below:
   a. Mounting a NID SoC IC to an existing SFP Printed Circuit Board (PCB)
   b. Using the power from the SFP module, without requiring separate external power
   c. NID SoC having only 2 ports, each with its own MAC and possibly PHY layer
   d. NID SoC having an embedded microprocessor, RAM and ROM
   e. Running a Web portal or other remote login and management software on the NID SoC
   f. Miniaturizing the NID to make it cheaper, with reduced cost of inventory, shipment, and installation
   g. Supporting one or more (multiple) of the following functions in NID SoC:
      OAM
      Media conversion
      Rate adaptation
      Policing & marking
      Shaping
      SLA performance monitoring
      Statistics collection
      Header manipulation
      Security
      In-band management
2. Building the NID functionality in a Dongle that hangs off an Electrical Ethernet port that supports POE (Power over Ethernet), with one or more of the features below:
   a. Similar to SFP-NID, but hanging off an Electrical Ethernet port
   b. Using the power from the Ethernet port POE, without requiring separate external power.

BRIEF DESCRIPTION OF THE DRAWINGS

The following figures are just some examples/embodiments, to explain better.

DETAILED DESCRIPTION OF THE PREFERRED EMBODIMENTS

Here are some of the embodiments/examples of the current invention:

SFP-NID Functional Definition

SFP-NID is a demarcation device that is mainly used at hand-off point between a customer and a SP, to demark the responsibility of an SP and a customer. It could also be used as a demarcation device between two SPs. For example, it can be used at each end of an E-NNI (or External Network-to-Network Interface). An SFP-NID is mainly used to monitor the health of connection and service and to diagnose failures up to the SFP-NID.

An SFP-NID has 2 physical ports, one that connects to the SP WAN link, and another one that connects to the customer NE (CPE) or another SP network element. It also has a logical port that is connected to the management interface.

An SFP-NID may support any of the following functionalities:
OAM
Media conversion
Rate adaptation
Policing & marking
Shaping
SLA performance monitoring
Statistics collection
Header manipulation
Security
In-band management
OAM An SFP-NID should support OAM functionalities that are required to detect and diagnose connectivity failure. An SFP-NID is expected to support Link OAM based on 802.3ah. It may also support Service OAM based on 802.1ag or Y.1731.

In order to support Link OAM, the SFP-NID should support Passive DTE functionalities, as per 802.3ah. And, to support Service OAM, the SFP-NID should support Service Provider and Network operator level MEPs, as well as Customer level MIPs.

Media Conversion

An SFP-NID generally should support media conversion. The network-side interface (most commonly) is 1000BASE-LX, while the customer-side interface (most commonly) is 100BASE-FX or 1000BASE-SX or 1000BASE-LX. An SFP-NID could support any Ethernet PHY at customer and network interfaces.

Rate Adaptation

When the customer-side interface and the network-side interface have different rates, the SFP-NID should support enough buffering for rate adaptation between the two interfaces. For example, rate adaptation is required when the customer-side interface is 100BASE-FX and the network side interface is 1000BASE-LX.

Policing and Marking

An SFP-NID could optionally support Policing and Marking of packets (i.e., Bandwidth Profiling), based on single or dual token bucket algorithms, specified in MEF10. Dual bucket policer could enforce the Committed and Excess rates and bursts: (CIR, CBS), (EIR, EBS). The SFP-NID could also mark the P-bits the packets based on policing results, as per 802.1D/Q/ad/ah.

However, since and SFP-NID has only 2 ports and does not support customer multiplexing, it is more efficient from OPEX and CAPEX point of view, for the upstream node to perform policing and marking of packets, rather than the SFP-NID, and therefore, keeping the SFP-NID simpler and cheaper.

Shaping

An SFP-NID may optionally support shaping of traffic toward the customer, based on Egress BW profile. It may also support ingress shaping of customer traffic, when the customer traffic is bursty, and the customer cannot shape the traffic to the agreed SLA.

However, since and SFP-NID has only 2 ports and does not support customer multiplexing, it is more efficient from OPEX and CAPEX point of view, for the upstream node to perform shaping, rather than the SFP-NID, and therefore, keeping the SFP-NID simpler and cheaper.

SLA Performance Monitoring

An SFP-NID may support SLA performance monitoring, by supporting Ethernet Performance OAM, as per ITU-T Y.1731. This means that the SFP-NID could support one-way and two-way packet loss measurement, as well as one-way and two-way delay and one-way and two-way jitter measurement.

Statistics Collection

An SFP-NID should support standard Ethernet MIBs counters, as per IETF and MEF standards, such as number of packets sent or received, number of errored packets, etc. These counters could be used for diagnostics and/or billing purposes.

Header Manipulation

An SFP-NID could support header manipulation, such as VLAN translation, or addition of a new header, such as 802.1ad, 802.1ah, or MPLS.

Security

An SFP-NID could support security measures, such as ACL and Link security, based on 802.1ae and 802.1af. The security measures are invisible to the customer and are all measures inside the service provider network. Therefore, such security measures do not enforce any requirements on customer equipment.

In-Band Management

An SFP-NID should support in-band management, in order to configure the SFP-NID and read counters and states, via EMS-NMS. The SFP-NID could support a simple Web portal, to make it user friendly, for remote reading and configuration.

SFP-NID Physical and Electrical Specifications

An SFP-NID fits completely inside an SFP, XFP, or Xenpack module. The SFP-NID uses the internal SFP, XFP, or Xenpack DC power, and it does not require an external power supply.

An SFP-NID has only 2 physical ports: one that connects to the SP WAN link, and another one that connects to the customer NE (CPE) or another SP network element. The WAN port is (most commonly) an optical Ethernet port, such as 1000BASE-LX, while the customer port is the SFI, XFI or XAUI interface, depending on whether the SFP-NID is of SFP, XFP or Xenpack format.

An SFP-NID could also take the format of a Dingle with CAT5 interface that connects to a 10/100/1000BASE-T port, which supports Power over Ethernet (PoE). In such a case, the 10/100/1000BASE-T port via PoE provides the power of SFP-NID Dingle.

Figure 1:
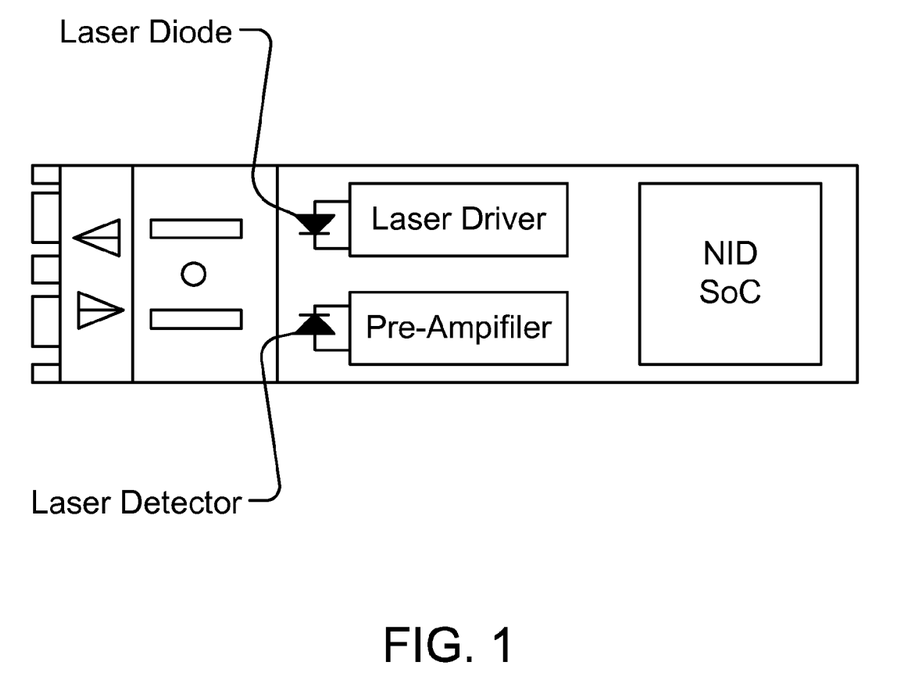
FIG. 1 shows an example (top view) of the Physical layout of an SFP-NID, built on a standard SFP module.

FIG. 1 shows an example (top view) of the Physical layout of an SFP-NID, built on a standard SFP module. It consists of the usual SFP electronics, such as Laser driver and pre-Amp (plus laser diode/laser detector), as well as a new chip called NID SoC that performs the NID functionalities.

There is a power and size limit for NID SoC chip, depending on which type of module format the SFP-NID has (SFP, XFP, Xenpack, etc.). For example, for an SFP module, the NID SoC should have a size of less than 13.7 mm×13.7 mm. A size of 10 mm×10 mm NID SoC is a good size that fits very well inside an SFP module. Also, the power limitation for an NID SoC inside an SFP module is approximately 1 Watt.

SFP-NID Block Diagrams

Figure 2:
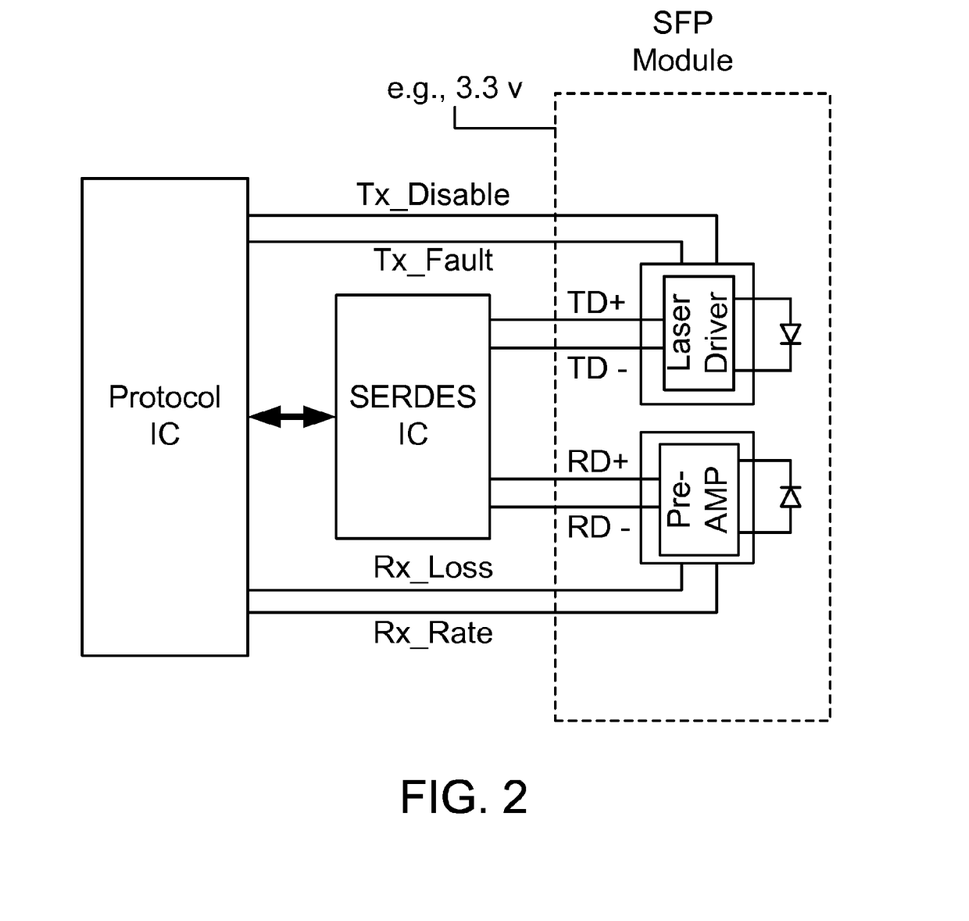
FIG. 2 shows the block diagram of a standard SFP module.

An SFP, XFP and Xenpack module consist of Serdes, Laser driver, and amplifiers. FIG. 2 shows the block diagram of a standard SFP module. As can be seen from the diagram, the SFP module receives its power from the host device, via a 3.3 V power line. Also, the receive-and-transmit interfaces are Serdes interfaces with SFI protocol.

Figure 3:
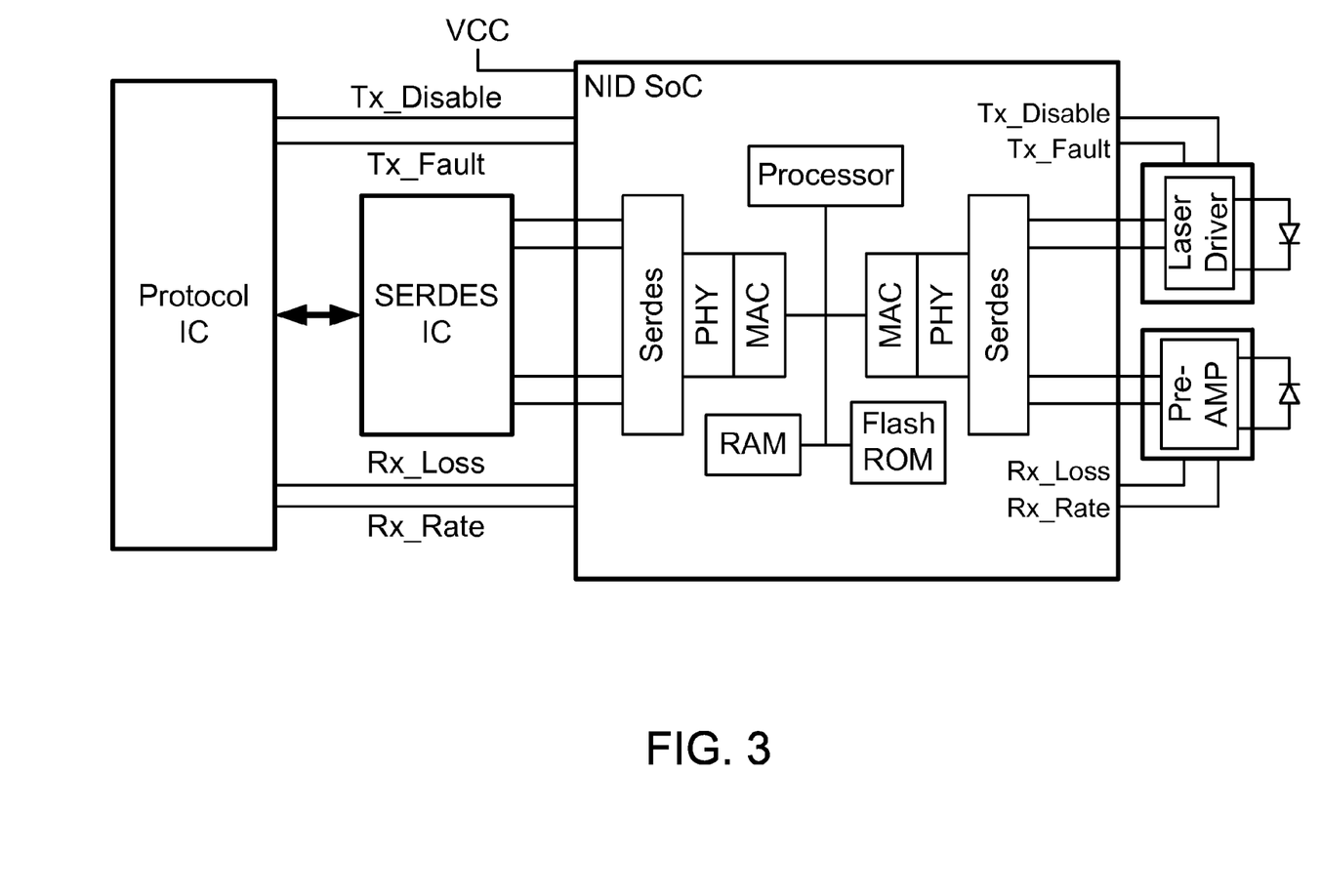
FIG. 3 shows (an example) a block diagram of an SFP-NID within an SFP module.

FIG. 3 shows (an example) a block diagram of an SFP-NID within an SFP module. As can be seen, the interfaces are the same as that of an SFP module, but internally, the PHY and MAC layers and the Serdes interfaces are terminated, and the packets are processed (for example) by a microprocessor and some dedicated hardware, called NID SoC, and then transmitted over another PHY, MAC and Serdes interface. The microprocessor interface is used as a logical port for Management and OAM flow termination and processing. Dedicated hardware, such as Encryption, ICV (Integrity Check Value), or CRC, could also exist in the SFP-NID module.

Figure 4:
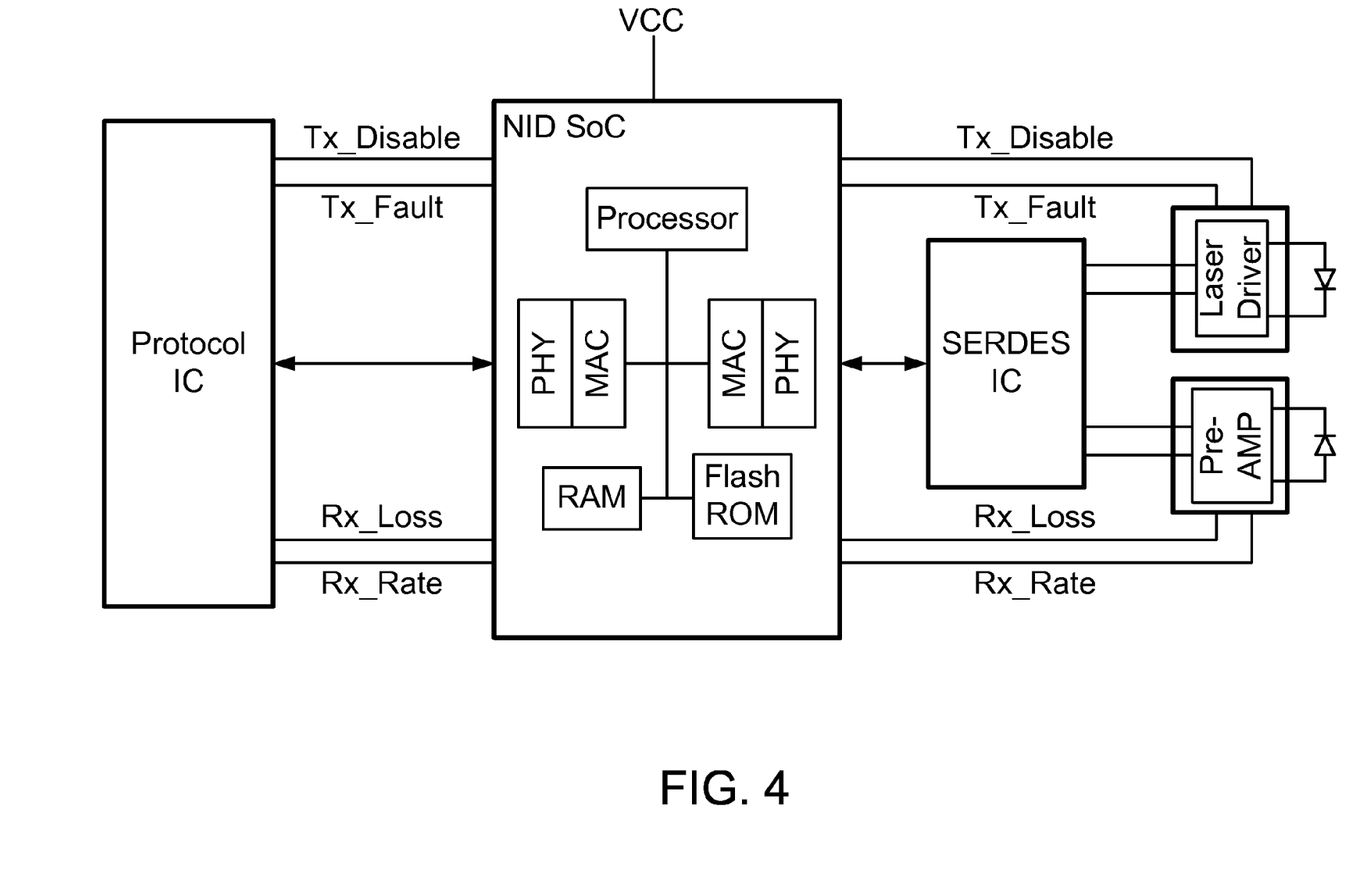
FIG. 4 shows (another example) an alternative block diagram of an SFP-NID within an SFP module, where the NID SoC is positioned between the Protocol IC and the Serdes IC.

FIG. 4 shows (another example) an alternative block diagram of an SFP-NID within an SFP module, where the NID SoC is positioned between the Protocol IC and the Serdes IC. Any other configurations and variations similar to the above are also covered under this invention.

SFP-NID Applications

An SFP-NID could have many applications. The following lists some known applications of SFP-NID:

As demarcation device between a customer and a Service provider

As retrofit to a customer CPE/CE or Service Provider PE Ethernet switch.

Demarcation Device, e.g. Between a Customer and SP

Figure 5:
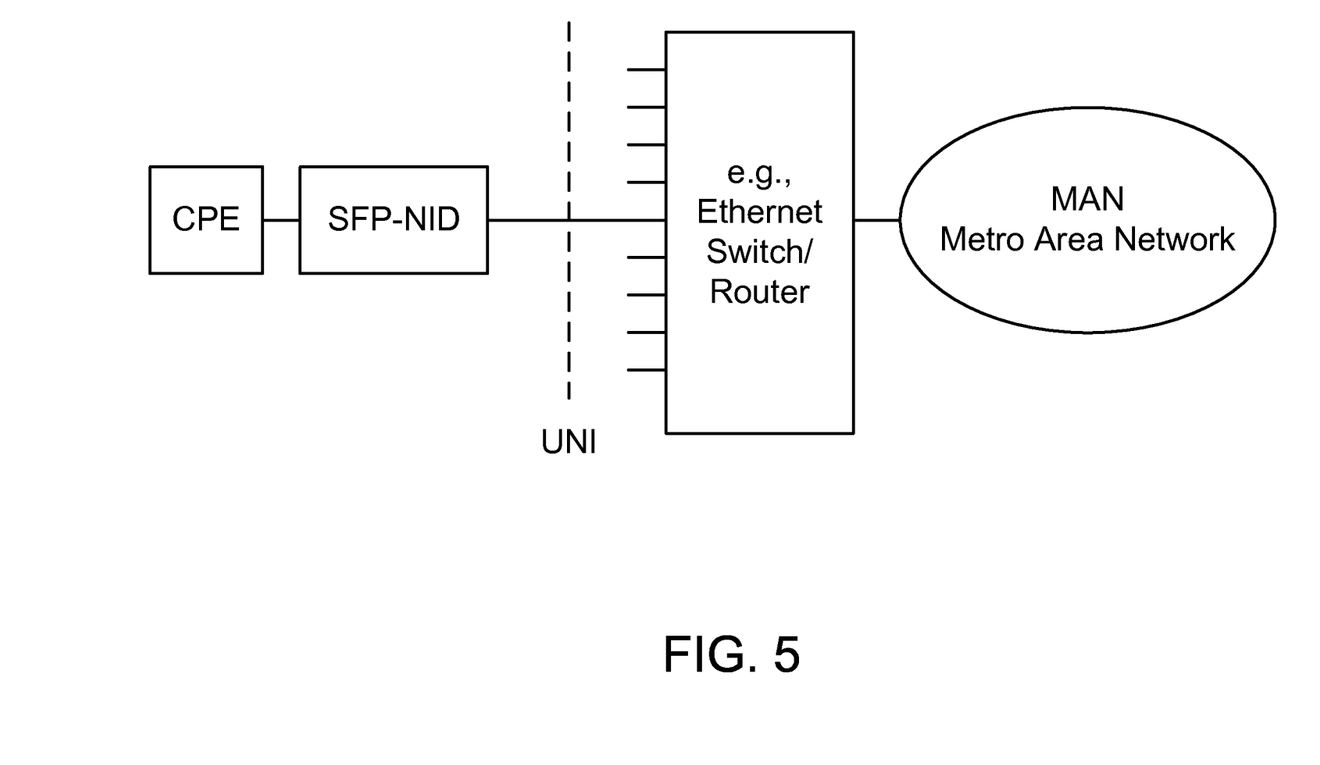
FIG. 5 shows an application of a NID, as a Demarcation Device, e.g. between a customer and SP.

This application is the main application of a NID. In this application, the standard SFP, XFP or Xenpack module of a customer CPE UNI (user network interface) interface is replaced with SFP-NID. The SFP-NID belongs to the Service Provider and is used to monitor and diagnose service connectivity up to the customer CPE box. This application is shown in FIG. 5.

Retrofit to a Customer CPE/CE or a Service Provider PE Ethernet Switch

Figure 6:
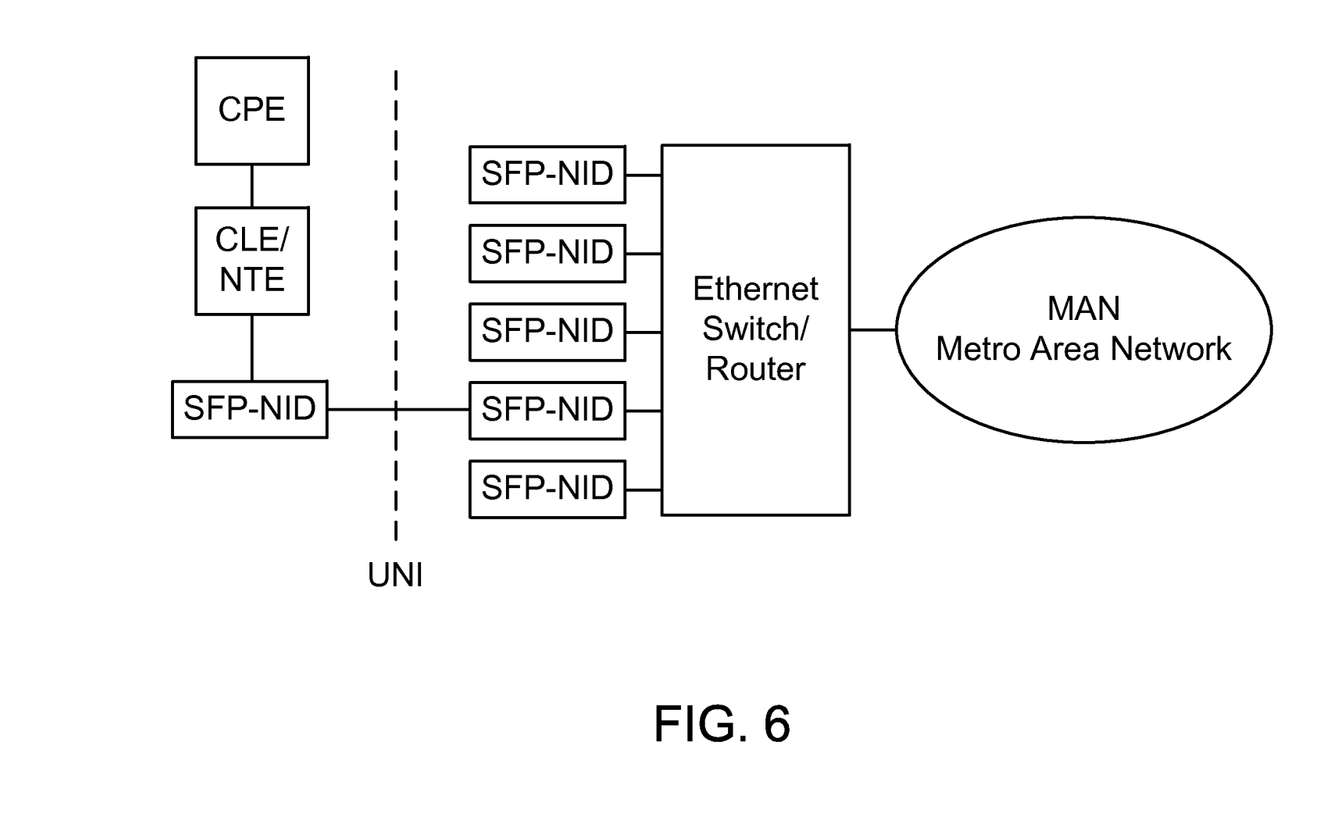
FIG. 6 shows an application of SFP-NID, to retrofit to a customer CPE/CE or a Service Provider PE Ethernet switch.

In this application the SFP-NID could be used to retrofit the customer-located CLE/NTE and/or the Service Provider PE switch, when SFP-NID functionalities are not built in to those boxes. FIG. 6 shows this application of SFP-NID.

SFP-NID Advantages

SFP-NID is a very small device that can be easily stored, mailed to customers, or carried in the pocket of the maintenance personnel.

SFP-NID requires no external power and does not add any extra footprint, therefore, making it ideal for upgrading existing SFP modules, without requiring extra space, especially in high density line cards.

It costs less to build that, to maintain it, to install it, to store it, or to ship it to the user/customer.

Note that SFP-NID does not have its own dedicated power supply, therefore, making it unavailable when the host device (such as a customer router or switch) loses power. However, the advantages mentioned above are far more important for the user and Service Provider. Thus, the current invention and its embodiments are very useful and important for the user and Service Provider, in this industry.

This invention applies to any number of ports and any type of components. It also applies to any type of communications and devices or interfaces. This invention applies to any order or setup or configuration for components, circuits, and sub-systems, for network communication and connectivity. It applies to any communication formats and protocols (and any combinations of software and hardware). The illustrations above just serve examples, but they are not limiting the scope of our invention here.

Any variations of the above teaching are also intended to be covered by this patent application.

The invention claimed is:

1. A network demarcation device, said network demarcation device comprising:
    a network demarcation module on a system-on-chip circuit;
    a short form factor pluggable optical module;
    wherein said network demarcation module is mounted to said short form factor pluggable optical module's circuit board;
    wherein electrical power for said network demarcation module is provided by said short form factor pluggable optical module, without having a separate external power supply;
    wherein said network demarcation module comprises at least two ports, with at least one of said at least two ports having its own media access control and physical layers;
    wherein a management function module, comprising a management software, is operated on said network demarcation module;
    said management function module supports all following functions:
        a) operation, administration, and management function,
        b) media conversion function,
        c) service level agreement performance monitoring function,
        d) statistical data collection function, and
        e) in-band management function, to manage from a remote location;
    wherein said in-band management function is configured via a simple network management protocol or a network management system interface;
    wherein said network demarcation device is located between a service provider and a customer equipment;
    wherein said service provider directly monitors, manages, or checks a status and health of connections and services for said customer equipment through said network demarcation device.

2. The network demarcation device as recited in claim 1, wherein said network demarcation device comprises a processor.

3. The network demarcation device as recited in claim 1, wherein said network demarcation device comprises a random-access memory.

4. The network demarcation device as recited in claim 1, wherein said network demarcation device comprises a read-only memory.

5. The network demarcation device as recited in claim 1, wherein said management function module supports rate adaptation function.

6. The network demarcation device as recited in claim 1, wherein said management function module supports policing-and-marking function.

7. The network demarcation device as recited in claim 1, wherein said management function module supports shaping function.

8. The network demarcation device as recited in claim 1, wherein said management function module supports header manipulation function.

9. The network demarcation device as recited in claim 1, wherein said management function module supports security function.

10. The network demarcation device as recited in claim 1, said network demarcation device comprises a serializer-deserializer module integrated circuit.

11. The network demarcation device as recited in claim 1, said network demarcation device comprises a dongle.

12. The network demarcation device as recited in claim 1, said network demarcation device comprises a power-over-Ethernet module.

13. The network demarcation device as recited in claim 1, wherein said customer equipment comprises a router or a switch.

14. The network demarcation device as recited in claim 1, said network demarcation device comprises a laser driver.

15. The network demarcation device as recited in claim 1, said network demarcation device comprises an amplifier.

16. The network demarcation device as recited in claim 1, said network demarcation device comprises a protocol integrated circuit.

17. The network demarcation device as recited in claim 1, said network demarcation device comprises an optical Ethernet port.

18. The network demarcation device as recited in claim 1, said network demarcation device comprises a laser diode.

* * * * *